United States Patent
Thayer

(10) Patent No.: US 7,599,235 B2
(45) Date of Patent: *Oct. 6, 2009

(54) MEMORY CORRECTION SYSTEM AND METHOD

(75) Inventor: Larry Jay Thayer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 11/982,532

(22) Filed: Nov. 2, 2007

(65) Prior Publication Data

US 2008/0065933 A1    Mar. 13, 2008

Related U.S. Application Data

(63) Continuation of application No. 11/214,697, filed on Aug. 30, 2005, now Pat. No. 7,307,902.

(51) Int. Cl.
*G11C 29/00* (2006.01)
*G11C 7/00* (2006.01)

(52) U.S. Cl. ................................ 365/200; 365/201
(58) Field of Classification Search ................ 365/200, 365/201, 189.08, 230.03; 714/710
See application file for complete search history.

(56) References Cited

U.S. PATENT DOCUMENTS 7,096,406 B2 *   8/2006   Kanazawa et al. .......... 714/763
7,307,902 B2 * 12/2007   Thayer ....................... 365/200

* cited by examiner

*Primary Examiner*—Pho M Luu
*Assistant Examiner*—Toan Le

(57) ABSTRACT

An error correction system and method operable to identify and correct a memory module disposed within a computer memory system. In one embodiment, the memory system comprises a first memory module and a second memory module, each comprising a plurality of memory devices; and a memory controller operably coupled to the first memory module and the second memory module, the memory controller operable to use an error correction code (ECC) word, comprising data and redundant data, to detect module-level errors in the first and second memory modules.

20 Claims, 5 Drawing Sheets

| 12 BITS | 4 BITS | 4 BITS | 4 BITS | 4 BITS | 4 BITS | 4 BITS | 104 BITS | |
|---|---|---|---|---|---|---|---|---|
| ECC0 | TAG[27:12] | | | | CHECKSUM[11:0] | | DATA0[103:0] | CHUNK0 — 502-0 |
| ECC1 | DATA1<br>[127:124] | DATA2<br>[127:120] | DATA3<br>[127:116] | DATA0<br>[127:104] | DATA1<br>[119:104] | DATA2<br>[119:104] | DATA1[103:0] | CHUNK1 — 502-1 |
| | | | | | | | DATA2[103:0] | CHUNK2 — 502-2 |
| | | | | | | DATA3<br>[111:104] | DATA3[103:0] | CHUNK3 — 502-3 |
| ECC2 | DATA4<br>[127:112] | DATA5<br>[127:108] | | | | DATA4<br>[111:104] | DATA4[103:0] | CHUNK4 — 502-4 |
| | | | | | | DATA5<br>[107:104] | DATA5[103:0] | CHUNK5 — 502-5 |
| ECC3 | DATA6<br>[127:104] | | | | | | DATA6[103:0] | CHUNK6 — 502-6 |
| | DATA7<br>[127:104] | | | | | CHECKSUM<br>[3:0] | DATA7[103:0] | CHUNK7 — 502-7 |

MEMORY CORRECTION SYSTEM AND METHOD

CLAIM OF PRIORITY UNDER 35 U.S.C. §120 & 37 C.F.R. §1.78

This nonprovisional application is a continuation application claiming the benefit of the following prior U.S. patent application entitled: "MEMORY CORRECTION SYSTEM AND METHOD," application Ser. No. 11/214,697, filed Aug. 30, 2005 now U.S. Pat. No. 7,307,902, in the name(s) of Larry J. Thayer, which is hereby incorporated by reference.

BACKGROUND

Electronic data storage utilizing commonly available memories (such as Dynamic Random Access Memory or DRAM) can be problematic. Specifically, there is a finite probability that, when data is stored in memory and subsequently retrieved, the retrieved data will suffer some corruption. For example, DRAM stores information in relatively small capacitors that may suffer a transient corruption due to a variety of mechanisms, e.g., charged particles or radiation (i.e., soft errors). Additionally, data corruption may occur as the result of hardware failures such as loose memory modules, blown chips, wiring defects, and/or the like. The errors caused by such failures are often referred to as repeatable errors, since the same physical mechanism repeatedly causes the same pattern of data corruption.

To address this problem, a variety of error detection and error correction algorithms have been developed. In general, error detection algorithms typically employ redundant data added to a string of data. The redundant data is calculated utilizing a checksum or cyclic redundancy check (CRC) operation. When the string of data and the original redundant data is retrieved, the redundant data is recalculated utilizing the retrieved data. If the recalculated redundant data does not match the original redundant data, data corruption in the retrieved data is detected.

Error correction code (ECC) algorithms operate in a manner similar to error detection algorithms. When data (or, payload) is stored, redundant data is calculated and stored in association with the data. When the data and the redundant data are subsequently retrieved, the redundant data is recalculated and compared to the retrieved redundant data. When an error is detected (e.g, the original and recalculated redundant data do not match), the original and recalculated redundant data may be used to correct certain categories of errors.

Although current ECC solutions are known to be generally effective in addressing certain types of memory errors, higher levels of reliability are constantly being pursued in the design of memory systems.

BRIEF DESCRIPTION OF THE DRAWINGS

FIG. 5 depicts an exemplary cache line layout having one or more checksum portions according to one embodiment.

DETAILED DESCRIPTION OF THE DRAWINGS

An error correction scheme operable with a memory system is set forth hereinbelow wherein a portion of a redundant data field in an ECC word is utilized for identifying a defective memory module disposed in an electronic environment, e.g., a computer system. In one embodiment, the memory system comprises a plurality of memory modules organized as a number of ECC domains, wherein each ECC domain includes a set of memory modules, each memory module comprising a plurality of memory devices. A module error correction engine is operable in association with a memory controller operably coupled to the plurality of memory modules, the module error correction engine operating to identify which one of the memory modules of a particular ECC domain is defective and thereby recover the defective memory module's data based on a redundant memory module associated with the particular ECC domain.

Figure 1:
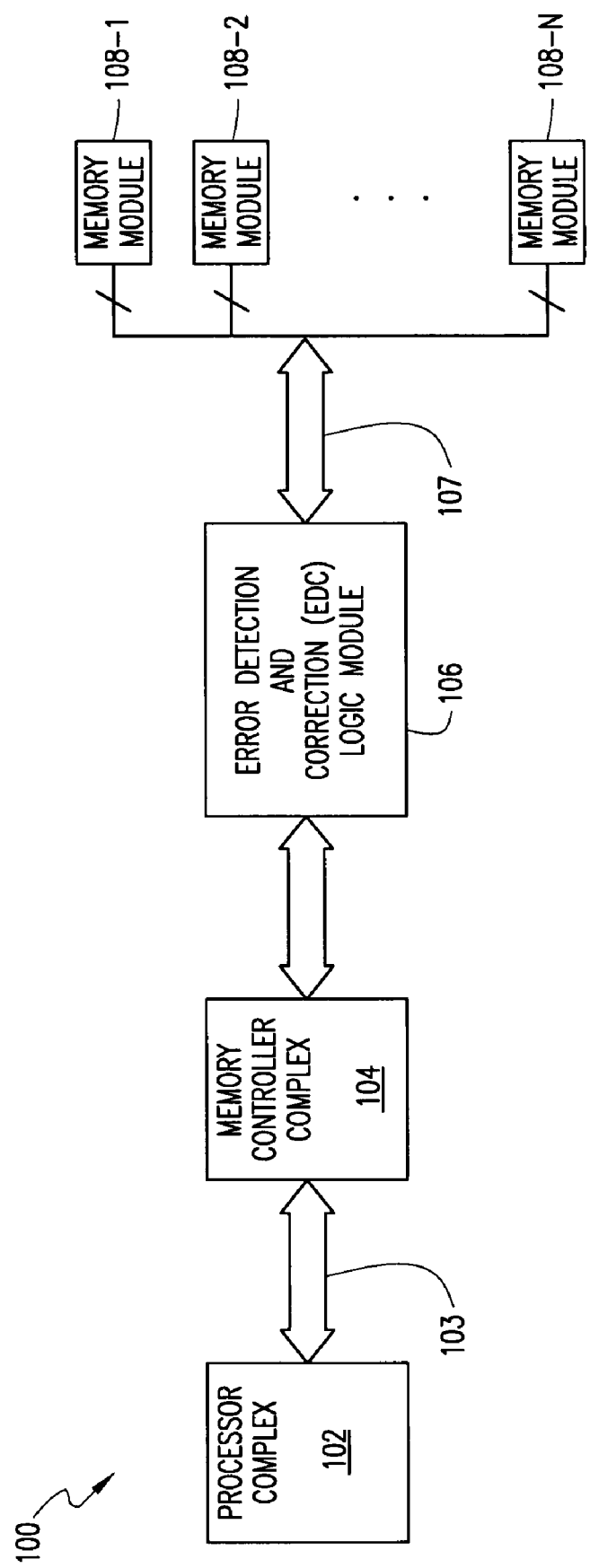
FIG. 1 is a block diagram of an exemplary computer system wherein a memory error correction scheme may be practiced according to one embodiment.

Representative embodiments of the present patent disclosure will now be described with reference to various examples wherein like reference numerals are used throughout the description and several views of the drawings to indicate like or corresponding parts, and further wherein the various elements are not necessarily drawn to scale. Referring to FIG. 1, depicted therein is a block diagram of an exemplary computer system 100 wherein a memory error detection and correction system and method may be practiced according to one embodiment. A processor complex 102 comprises any number of processors, with known or heretofore unknown types, hardware designs and architectures, et cetera, that are operably coupled to a memory controller complex 104 via a generalized interconnect topology 103 for purposes of effectuating memory operations in association therewith. Those skilled in the art should recognize that the interconnect topology 103 may involve one or more appropriate host bus segments, cross-bar connections, bus-to-bus bridges, and/or other electronic circuitry, which are selected depending on the architectural scheme of the computer system. The memory controller complex 104, which may include any number of memory controllers, is operably associated with one or more error detection/correction (EDC) modules 106 to detect and correct module-level errors (i.e., errors that can render an entire memory module inoperable) with respect to a plurality of memory modules 108-1 through 108-N that form at least a portion of a memory subsystem of the computer system 100. As will be set forth in detail below, the EDC module 106 may be implemented in hardware, software, firmware, or in any combination thereof, and may be integrated within the memory controller complex 104 for correcting module-level failures that may occur within the memory subsystem. Additionally, the EDC module 106 may interoperate with other error correction schemes that may be provided for addressing chip-level (or, device-level) memory failures as well, the details of which schemes may be found in one or more of commonly owned U.S. patents: U.S. Pat. No. 7,149,945 and U.S. Pat. No. 7,227,797.

In one exemplary implementation, the memory controller complex 104 and associated EDC module 106 may be operably coupled to the memory modules 108-1 through 108-N via any suitable interconnect topology 107 to form a memory system, wherein the interconnect topology 107 allows for the practice of the teachings set forth herein without regard to data bus widths (i.e., different data word sizes including redundant data for error correction), data bus segmentation, bandwidth capacities, clock speeds, etc., except the requirement that the interconnect topology 107 be preferably adaptable to operate with a variable number of memory modules that may be hierarchically organized into a number of logical levels. Conceptually, an embodiment of the hierarchical memory organization is envisioned to comprise at the lowest level a plurality of individual memory devices (not shown) that are grouped into a number of memory modules, e.g., memory modules 108-1 through 108-N, which in turn may be arranged as one or more ECC domains wherein each ECC domain includes a set of memory modules. Clearly, additional and/or alternative levels of hierarchical organization may be implemented in other arrangements. Regardless, the logic associated with the EDC module 106 is operable to detect memory errors at module-level (e.g., faults that may render an entire memory module inoperable), and apply a suitable error correction engine for correcting the module-level errors in order to improve memory system reliability.

Figure 2:
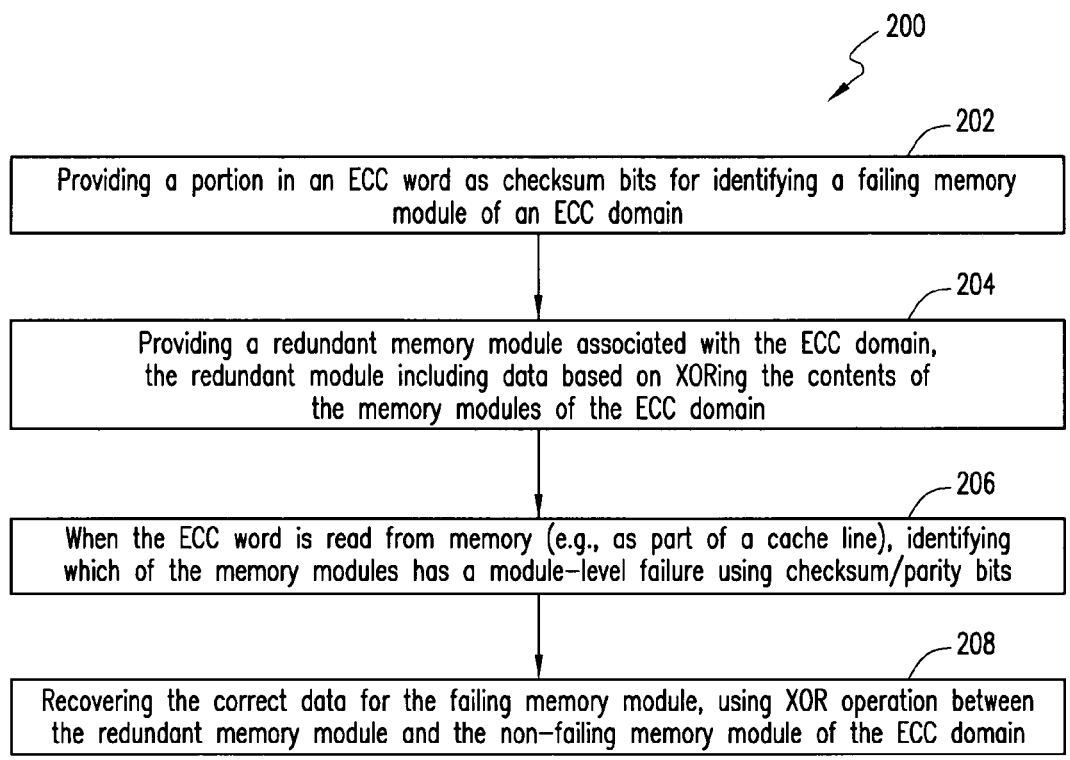
FIG. 2 illustrates an embodiment of an error correction method operable with a memory system.

FIG. 2 illustrates an embodiment of an error correction method 200 operable with a memory system such as the computer memory system described above, wherein a module-level error may be identified with a very high degree of probability for subsequent corrective measures. As alluded to previously, the exemplary memory system comprising a plurality memory modules may be organized as a number of ECC domains, wherein each ECC domain includes a set of memory modules, each memory module having a plurality of memory devices. Each ECC domain contributes to an ECC word that may be read as part of a cache line, wherein the ECC word is typically provided with a redundant data field, within which a plurality of bits may be provided as "spare" bits. At least a portion of these spare bits may be utilized as a checksum for identifying the address of a memory module that is afflicted with a fault that is uncorrectable by means of normal ECC algorithms (e.g., those used for device-level errors), hence a module-level failure. Accordingly, the methodology 200 involves providing a checksum portion (also referred to as a parity bit portion) in an ECC word for identifying a failing memory module of an ECC domain (block 202). Those skilled in the art should recognize upon reference hereto that a number of implementations are possible for utilizing the spare bits for purposes of the present patent disclosure. In one embodiment, the address bits of the memory modules may be XORed into respective checksum portions and, if there is a module-level failure, the bits read from the respective checksum portions may be compared against respective XORed addresses of the memory modules of a particular ECC domain. Assuming the failure mode is random, the probability of correctly identifying a failing memory module is:

$$\text{Probability}\{ID\}=[2^N-1]/2^N$$

where N=the number of checksum/parity bits allocated for address identification. For example, if 8 bits are allocated per memory module, then the probability would be 255/256.

A redundant memory module may be provided for each ECC domain in the exemplary memory system so that a module-level failure in any particular ECC domain may be recovered (block 204). The redundant memory module includes data based on XORing between the contents of the two memory modules of the ECC domain. When the ECC word is read from memory (e.g., as part of a cache line), and if it is detected that there is an uncorrectable failure in one of the two memory modules, the failing module is identified based on analyzing the checksum portion of the ECC word (block 206). Thereafter, the failing memory module's data may be recovered based on the contents of the redundant memory module associated with the particular ECC domain (block 208). Specifically, the failing memory module's data may be reconstructed using an XOR process between the data of the redundant memory module associated with the particular ECC domain and the data of the non-failing memory module thereof.

It should be appreciated that the error correction scheme set forth above may also be implemented in conjunction with a hierarchical memory correction method where both lower level memory errors (e.g., device-level failures) as well as higher level memory errors (e.g., module-level failures) may be corrected. For example, a conventional ECC scheme may be provided in association with a memory controller for correcting various errors that may afflict the lower hierarchical level in a memory system, e.g., single-bit errors, multi-bit errors, or errors that incapacitate an entire memory device or at least a portion thereof, using any known or heretofore unknown ECC methodologies and algorithms, such as chip-kill correct (i.e., chip spare) and chip erasure techniques, etc. Additionally, a module-level error correction engine may be provided in association with the memory controller for correcting the module-level errors in the memory system, e.g., errors that give rise to failure of an entire module, in accordance with the teachings set forth above. Further details regarding an implementation of a hierarchical memory correction system and method may be found in the commonly owned U.S. Pat. No. 7,227,797.

Figure 3:
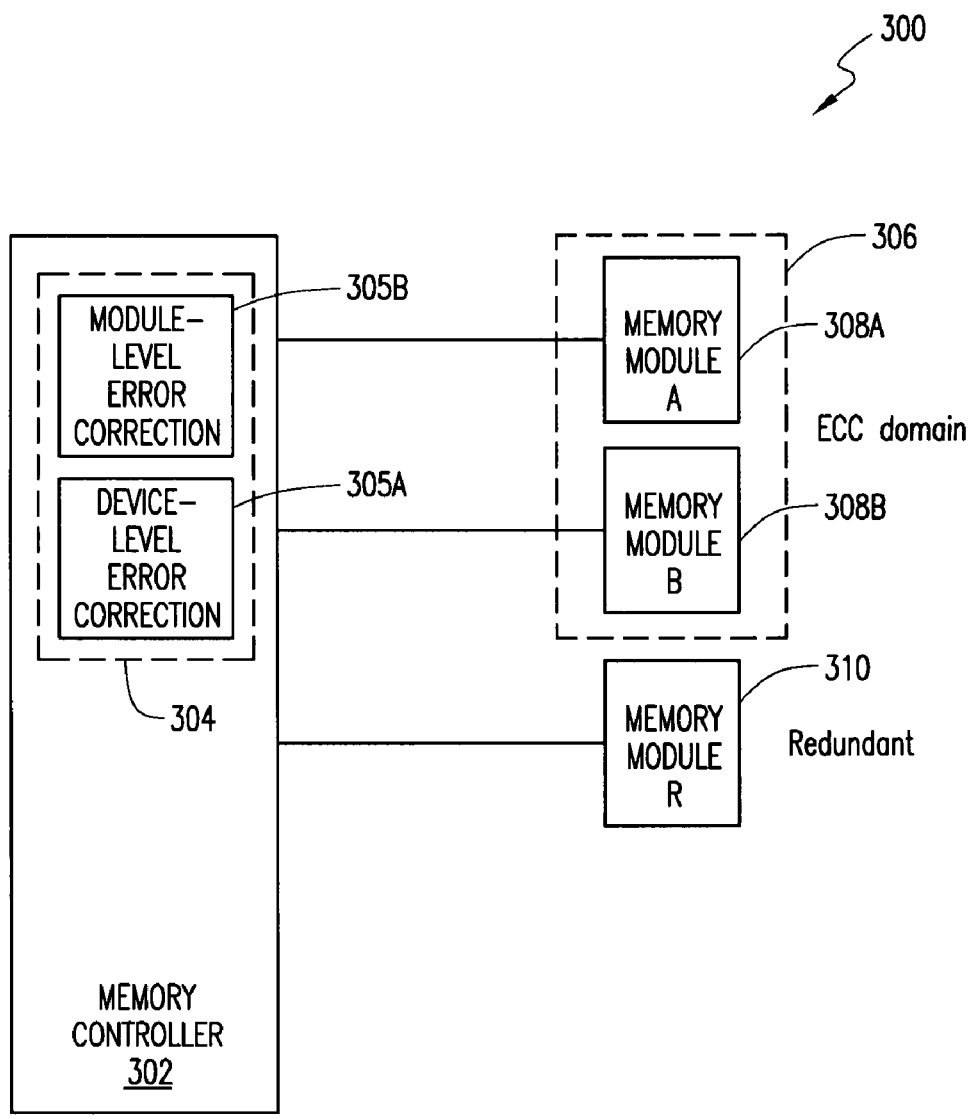
FIG. 3 is a block diagram of an exemplary memory system having a plurality of memory modules arranged in a number of ECC domains wherein a portion of the redundant data of an ECC word may be utilized as a checksum portion for identifying a failing memory module.

Referring now to FIG. 3, depicted therein is a block diagram of an exemplary memory system 300 having a plurality of memory modules arranged in a number of ECC domains wherein a portion of the redundant data in an ECC word may be utilized as a checksum portion for identifying a failing memory module. A memory controller 302 includes an EDC block 304 which may comprise a device-level error correction engine 305A as well as a module-level error correction engine 305B in one embodiment. In some exemplary implementations, memory controller 302 may comprise some of the memory controller arrangements shown in the following co-pending commonly owned U.S. patent applications: (i) "SYSTEMS AND METHODS FOR PROVIDING ERROR CORRECTION CODE TESTING FUNCTIONALITY," application Ser. No. 10/435,149, filed May 9, 2003, in the name(s) of: Christopher M. Brueggen; (ii) "SYSTEMS AND METHODS FOR PROCESSING AN ERROR CORRECTION CODE WORD FOR STORAGE IN MEMORY COMPONENTS," application Ser. No. 10/435,150, filed May 9, 2003, in the name(s) of: Christopher M. Brueggen; and (iii) "RAID MEMORY SYSTEM," application Ser. No. 10/674, 262, filed Sep. 29, 2003, in the name(s) of: Larry Thayer, Eric McCutcheon Rentschler and Michael Kennard Tayler, incorporated by reference herein.

For purposes of the present patent disclosure, two memory modules 308A, 308B are exemplified that are operated as a particular ECC domain 306. Those skilled in the art should recognize that although only two memory modules are shown as an ECC domain, there may be other arrangements with a plurality of ECC domains wherein more than two memory modules or portions thereof (i.e., a set of modules) are operated as a single ECC domain. Furthermore, a memory module may be generalized as a grouping of memory devices that are physically and/or logically treated as a single unit by the memory controller 302. Regardless of how an ECC domain is implemented in terms of its constituent memory modules, a redundant memory module 310 may be provided in association with the ECC domain 306 for correcting module-level failures associated therewith. Accordingly, if the total number of ECC domains are P, there may be P redundant memory modules, each corresponding to a specific ECC domain.

The memory modules 308A, 308B are operable to store ECC data and may contribute to one or more portions of a cache line depending on the memory access architecture, wherein each ECC word or sub-word includes a predetermined number of data bits as well as a predetermined number of ECC bits, i.e., redundant data, based on applicable memory system design and ECC techniques. As will be described in additional detail below, at least a portion of the redundant data may be used for identifying which one of the memory modules of the ECC domain 306 is defective, if a module-level failure associated with the domain is detected by the EDC module 304. The redundant memory module 310 corresponding to the ECC domain 306 includes data that is based on the contents of the memory modules 308A, 308B. In particular, the redundant memory module 310 contains data bases on XORing of the memory modules 308A, 308B. An XOR engine or circuit (not explicitly shown in FIG. 3) is therefore operable to effectuate the following processing with respect to data storage in the memory system 300 in one embodiment:

$$Module_R = Module_A \oplus Module_B$$

wherein the symbol $\oplus$ denotes the bit-wise Exclusive-OR operation performed with respect to the memory modules of the ECC domain 306.

Because of the module-level redundancy provided in the memory system architecture by way of XOR circuitry, similar circuitry may be used as a module-level error correction engine for recovering data from a defective memory module of the ECC domain 306. For example, if the data in the memory module 308A is determined to be faulty or corrupted for some reason, that data may be recovered by an XOR engine operable to effectuate the following processing:

$$Corr\{Module_A\} = Module_B \oplus Module_R$$

which can be executed independent of any lower level ECC processing for correcting errors that may concurrently occur elsewhere in the memory system 300 of FIG. 3.

Figure 4C:
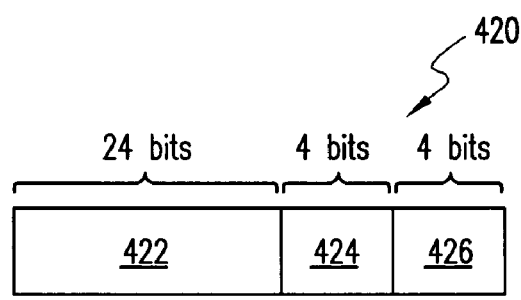
FIGS. 4A-4C depict further details of an exemplary ECC word and its redundant data for purposes of error identification according to one embodiment.
Figure 4A:
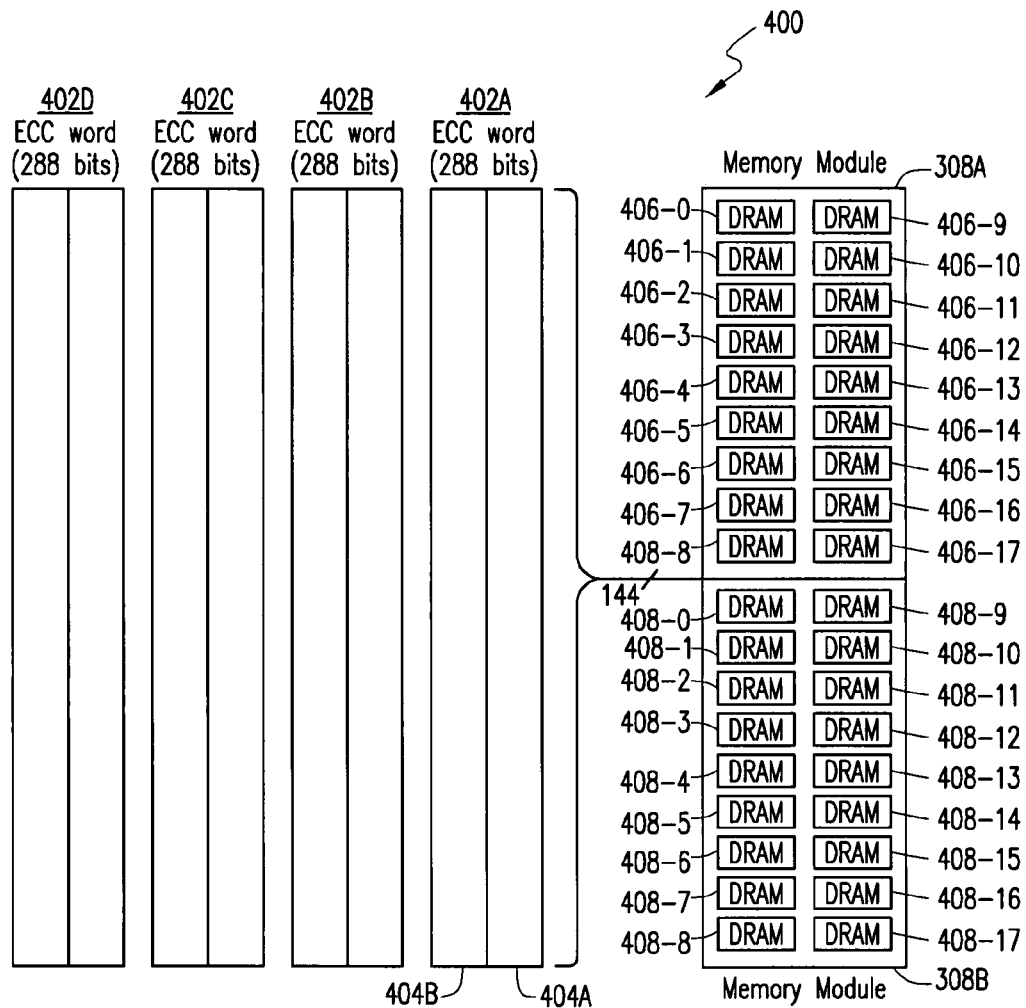
Figure 4B:
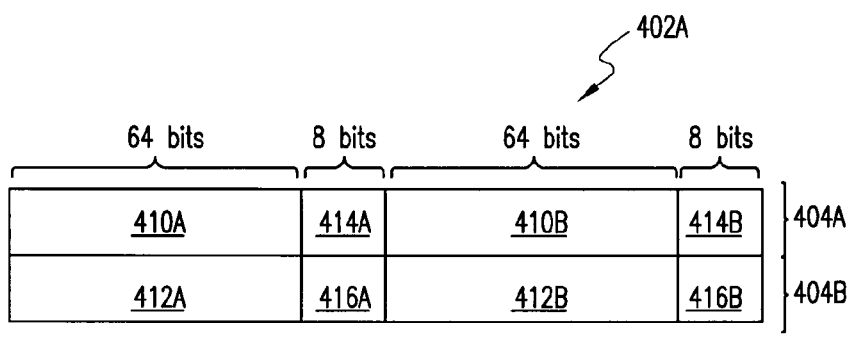

Referring now to FIGS. 4A-4C, depicted therein are further details of an exemplary ECC word embodiment and its redundant data as contributed by the memory modules 308A and 308B. In the embodiment shown in FIG. 4A, a cache line 400 is comprised of four ECC words 402A through 402D read in a burst, each having 256 data bits (i.e., payload) and 32 redundant bits, thereby giving rise to 128 bytes of data and 128 redundant bits in each cache line. Each memory module 308A, 308B, is exemplified with 18 DRAM devices, each contributing 4 bits of output (i.e., x4 DRAM). Reference numerals 406-0 through 406-17 and 408-0 through 408-17 refer to the DRAM devices of the memory modules 308A and 308B, respectively.

It should be recognized that the internal arrangement of the individual memory modules 308A, 308B (i.e., bus topologies and how the DRAM devices are coupled to the respective buffers, if any, and the like) is irrelevant for purposes of the present disclosure, and therefore not dealt with in this patent disclosure. Likewise, details concerning particular DRAM implementations such as data output width, e.g., x4, x8, or x16, etc., may also be deemed immaterial for the error correction purposes of the representative embodiments set forth herein. Additionally, although no buffers are explicitly shown with respect to the respective memory modules in FIG. 4A, they may be provided elsewhere in an exemplary memory system. For example, in some exemplary embodiments, the buffer circuitry may be provided as a separate block that is independent from the memory modules themselves.

Based on the illustrative memory module configuration of FIG. 4A, it can be seen that each memory module 308A, 308B contributes a 72-bit chunk, which gives rise to a 144-bit output from the ECC domain from a single read operation (data width of 128 bits plus 16 bits dedicated to ECC). By reading the ECC domain twice (corresponding to two locations in each of the memory modules), an ECC word of 288 bits is realized, wherein each half of the ECC word includes 144 bits. FIG. 4B depicts additional details of an exemplary ECC word, e.g., ECC word 402A, where reference numerals 404A and 404B refer to the two 144-bit halves of the ECC word 402A. Each half of the ECC word 402A is comprised of a 64-bit data portion and an 8-bit redundant bit portion. Accordingly, reference numerals 410A, 410B and 412A, 412B refer to the four 64-bit data portions and reference numerals 414A, 414B and 416A, 416B refer to the four 8-bit redundant bit portions of the ECC word 402A. Of the 32 bits of the redundant data, a portion may be utilized for purposes of effectuating error correction with respect to individual DRAM chips. Another portion of the redundant bits may be used for cache line directory information, e.g., for indicating various attributes (status, ownership, clean/dirty, etc.) associated with the cache line which the ECC word 402A is part of. Another portion of the redundant bits are the spare bits described previously, which are utilized for purposes of identifying which memory module of the ECC domain is defective.

FIG. 4C depicts an exemplary arrangement of a redundant data field 420 of 32 bits, wherein a 24-bit portion 422 is provided for normal ECC operations (i.e., device-level ECC), a 4-bit portion 424 is provided for directory information and a 4-bit portion 426 is provided as a checksum for identifying the failing memory module. The exact distribution or localization of the redundant data within the ECC domain of the memory modules 308A, 308B, is dependent on the specific ECC algorithm or methodology implemented therein, which is not particularly critical for purposes of the present patent application. Since there are four ECC words in an exemplary cache line, a total of 16 spare bits per cache line are available for identification checksum purposes, wherein each memory module may be allocated 8 bits. As alluded to before, by using the memory modules in parallel and allocating 8 bits per module, a failing memory module may be correctly identified with a high probability (255/256). In one exemplary implementation, as described previously, the address bits of the memory modules may be XORed into respective checksum portions and, if there is a module-level failure, the bits read from the respective checksum portions may be compared against respective XORed addresses of the memory modules of a particular ECC word. In another implementation, the whole ECC word may be XORed into all the spare bits of the memory modules, and when there is a module-level failure, the spare bits in the redundant memory module are compared against the spare bits of the respective memory modules to determine which module is defective. Although both these techniques are probabilistic (i.e., there is no 100% guaranty in correct identification of a failing memory module), the odds are significantly improved over the 50% chance of merely guessing (assuming two memory modules per ECC domain).

FIG. 5 depicts an exemplary cache line layout 500 having one or more checksum portions according to one embodiment. Specifically, cache line layout 500 in FIG. 5 is illustrative of the cache line format for communication of 1024-bit cache data to and from processors (not shown in this FIGURE) in a distributed shared memory architecture, for example. The respective bits (indexed from 0 to 1023) of the cache line are apportioned into a plurality of groups (denoted by DATA0-DATA7), each group containing 128 bits.

Cache line layout 500 in FIG. 5 exemplifies how the respective bits of cache lines received from processors may be stored in memory modules by a memory controller, e.g., controller 302, with ECC information, directory tag information as well as module identity checksum information. The ECC bits (the redundancy information) may be calculated utilizing known techniques, e.g., the Reed-Solomon code algorithm, described in one or more of the co-pending commonly owned U.S. patent applications incorporated hereinabove. The directory tag information may be created and updated in accordance with a memory coherency scheme to enable the memory system 300 to operate within a distributed shared memory architecture. Cache line layout 500 divides the cache line data, tag data, ECC bits, and checksum bits into eight portions or chunks 502-0 through 502-7, with each portion having 144 bits of data. Additionally, each portion includes 12 ECC bits (24 ECC bits per ECC word) that may be used to correct errors in two respective portions. For example, the 12 ECC bits of portion 502-0 and the 12 ECC bits of portion 502-1 are used to correct byte errors in the ECC code word formed by both of portions 502-0 and 502-1. Furthermore, the 16 bits of tag data are exemplified within portion 502-0. Likewise, the 16 checksum bits may be apportioned in any of the chunks of the cache line layout 500 as illustrated, wherein the individual cache line data groups (DATA7-DATA0) may be staggered though portions 502-0 through 502-7. As previously noted, the exemplary memory modules 308A and 308B comprise an ECC domain, e.g., ECC domain 306 that has a width of 144 bits. Since the cache line layout 500 may be adapted according to the physical layout of memory modules, each of portions 502-0 through 502-7 may be advantageously stored across the individual memory devices forming the ECC domain 306. It should be recognized, however, that the 1024 data bits, 96 ECC bits, 16 spare/checksum bits and 16 tag information bits may be arranged in a number of ways within a cache line layout depending on particular design implementation.

Based on the foregoing Description, those skilled in the art should appreciate that the embodiments of the present disclosure are advantageous in correcting module-level errors with a high degree of reliability while minimizing the amount of redundancy storage in a memory system. Furthermore, the teachings set forth herein may be practiced in conjunction with known ECC techniques for correcting lower level errors that may concurrently exist in the memory system.

Although the present disclosure has been described with reference to certain exemplary embodiments, it is to be understood that the forms shown and described are to be treated as illustrative only. Accordingly, various changes, substitutions and modifications can be realized without departing from the scope of the present disclosure as set forth in the following claims.

What is claimed is:

1. A memory system, comprising:
   a first memory module and a second memory module, each comprising a plurality of memory devices; and
   a memory controller operably coupled to said first memory module and said second memory module, said memory controller operable to use an error correction code (ECC) word, comprising data and redundant data, to detect module-level errors in said first and second memory modules.

2. The memory system as recited in claim 1, wherein said memory controller is connected to read at least two locations in each of said first and second memory modules to provide said error correction word.

3. The memory system as recited in claim 1, wherein said redundant data of said ECC word includes a checksum portion contributed by said first memory module and a checksum portion contributed by said second memory module for use by said memory controller to identify which of said first and second memory modules is defective.

4. The memory system as recited in claim 3, wherein a defective one of said first and second memory modules is identified based on XORing addresses of each of said first and second memory modules into respective checksum portions and comparing bits read from said respective checksum portions against respective XORed addresses of said first and second memory modules.

5. The memory system as recited in claim 1, further comprising a redundant memory module configured to be used with said first and second memory modules to recover corrupted data.

6. The memory system as recited in claim 5, wherein a defective one of said first and second memory module's data is recovered based on XORing between said redundant memory module's data and data from a non-defective one of said first and second memory modules.

7. The memory system as recited in claim 1, wherein said memory controller is further operable to detect device-level in said first and second memory modules.

8. A memory correction method operable with a memory system comprising first and second memory modules organized as an error correction code (ECC) domain, said ECC domain including a redundant memory module, each memory module having a plurality of memory devices, the method comprising:
   reading an ECC word that comprises data and redundant data from said first and second memory modules; and
   determining, based on said ECC word, whether one of said first and second memory modules is faulty.

9. The memory correction method as recited in claim 8, wherein reading an ECC word comprises reading two locations of said first and second memory modules.

10. The memory correction method as recited in claim 8, wherein if one of said first and second memory modules is faulty, recovering data from said faulty memory module using said redundant memory module.

11. The memory correction method as recited in claim 8, wherein a checksum portion is provided as part of said redundant data.

12. The memory correction method as recited in claim 8, further comprising determining whether one of said devices of said first and second memory modules is faulty, based on said redundant data.

13. The memory correction method as recited in claim 8, wherein a defective one of said first and second memory modules is identified based on XORing of addresses of each of said memory modules into respective checksum portions and comparing bits read from said respective checksum portions against respective XORed addresses of said memory modules.

14. A computer system, comprising:
   a processor complex operably coupled to a memory controller complex, said memory controller complex controlling memory operations with respect to first and second memory modules that are organized as an error correction code (ECC) domain, said first and second memory modules each comprising a plurality of memory devices; and a module error correction engine operable with said memory controller complex, said module error correction engine operating to determine whether one of said first and second memory modules is defective.

15. The computer system as recited in claim 14, wherein said memory controller complex is configured to read at least two locations of each of said first and second memory modules to recover an ECC word used by said module error correction engine.

16. The computer system as recited in claim 15, wherein said ECC word comprises redundant data used by said module error correction engine to identify which of said memory modules is defective.

17. The computer system as recited in claim 14, further comprising recovering a defective memory module's data based on said redundant memory module.

18. The computer system as recited in claim 14, wherein said module error correction engine is further operable with said memory controller complex to determine whether a device of said first and second memory modules is defective.

19. The computer system as recited in claim 17, wherein said module error correction engine is operable to identify a defective one of said first and second memory modules based on XORing addresses of each of said first and second memory modules into respective checksum portions and comparing bits read from said respective checksum portions against respective XORed addresses of said first and second memory modules.

20. The computer system as recited in claim 19, wherein said module error correction engine is operable to recover said defective memory module's data based on XORing between said redundant memory module's data and data from a remaining non-defective memory module.

* * * * *